(12) United States Patent
Schoenberger et al.

(10) Patent No.: US 9,227,358 B2
(45) Date of Patent: Jan. 5, 2016

(54) APPARATUS FOR HEATING PLASTIC PREFORMS WITH SAFETY DEVICE

(71) Applicant: KRONES AG, Neutraubling (DE)

(72) Inventors: Wolfgang Schoenberger, Brennberg (DE); Katharina Seidenberg, Regensburg (DE)

(73) Assignee: KRONES AG (DE)

( * ) Notice: Subject to any disclaimer, the term of this patent is extended or adjusted under 35 U.S.C. 154(b) by 280 days.

(21) Appl. No.: 14/073,358

(22) Filed: Nov. 6, 2013

(65) Prior Publication Data

US 2014/0167301 A1    Jun. 19, 2014

(30) Foreign Application Priority Data

Nov. 6, 2012    (DE) .......................... 10 2012 110 601

(51) Int. Cl.
*B29C 49/78* (2006.01)
*B29C 49/64* (2006.01)
*B29C 49/42* (2006.01)

(52) U.S. Cl.
CPC ............. *B29C 49/78* (2013.01); *B29C 49/6409* (2013.01); *B29C 49/4205* (2013.01)

(58) Field of Classification Search
CPC   B29C 49/78; B29C 49/6409; B29C 49/4205; B29C 2049/4231
See application file for complete search history.

(56) References Cited

U.S. PATENT DOCUMENTS

| | | | | |
|---|---|---|---|---|
| 3,506,840 A * | 4/1970 | Fink | ........................ | B07C 5/126 198/395 |
| 6,365,906 B1 * | 4/2002 | Spangenberg | ....... | B65G 47/256 250/223 B |
| 8,546,704 B1 * | 10/2013 | Minardi | .................. | G01G 19/42 177/25.18 |
| 8,813,944 B2 * | 8/2014 | Tanner | .................. | B65G 47/256 198/389 |
| 8,967,360 B2 * | 3/2015 | Tanner | .................. | B65G 11/023 193/2 R |
| 2004/0109747 A1 * | 6/2004 | Charpentier | ....... | B65G 47/1428 414/403 |

(Continued)

FOREIGN PATENT DOCUMENTS

| | | | | |
|---|---|---|---|---|
| AT | 412543 | 4/2005 | ............. | B29C 49/64 |
| DE | 11-292259 | 10/1999 | ........... | B65G 47/256 |

(Continued)

OTHER PUBLICATIONS

German Search Report issued in corresponding German Patent Application Serial No. 10 2012 110 601.0 dated Jul. 10, 2013 (4 pgs).
Extended European Search Report (no translation) issued in related application No. 13191829.4, dated Mar. 6, 2014 (4 pgs).

*Primary Examiner* — Ryan Ochylski
(74) *Attorney, Agent, or Firm* — Hayes Soloway P.C.

(57) ABSTRACT

An Apparatus for heating plastic preforms, with a transport device which transports the plastic preforms along a predefined transport path, wherein the transport device has a plurality of holding elements for holding the plastic preforms, with at least one heating device which heats the plastic preforms transported by the transport device. The heating device has a movable wall element which is arranged for at least part of the time below the transport path of the plastic performs. The apparatus also includes a detection device which detects an incorrect position and/or a falling of at least one plastic preform in relation to the holding element holding this, as well as a control device which initiates a movement of the wall element on the basis of an incorrect position and/or falling of the at least one plastic preform detected by the detection device.

12 Claims, 5 Drawing Sheets

(56) References Cited

U.S. PATENT DOCUMENTS

| | | | |
|---|---|---|---|
| 2008/0226763 A1 | 9/2008 | Charpentier | 425/534 |
| 2011/0198270 A1* | 8/2011 | Beutl | B29C 49/4205 209/552 |
| 2011/0256493 A1 | 10/2011 | Schoenberger et al. | 432/77 |
| 2013/0056913 A1* | 3/2013 | Forsthoevel | B29C 49/06 264/535 |
| 2013/0220769 A1* | 8/2013 | Stein | B65G 47/34 198/370.01 |

FOREIGN PATENT DOCUMENTS

| | | | |
|---|---|---|---|
| DE | 20311657 | 9/2004 | B29C 49/64 |
| DE | 10 2009 009 866 | 8/2010 | B29C 49/42 |
| DE | 10 2009 016 593 | 10/2010 | B29C 49/42 |
| DE | 102009057021 | 6/2011 | B29C 49/28 |
| DE | 10 2010 028 984 | 11/2011 | B65G 47/34 |
| EP | 2377668 | 10/2008 | B29C 49/64 |
| WO | WO 99/20406 | 4/1999 | B07C 5/06 |

* cited by examiner

APPARATUS FOR HEATING PLASTIC PREFORMS WITH SAFETY DEVICE

The present invention relates to an apparatus and method for heating plastic preforms. In the field of the drinks-producing industry, it is known that plastic containers are formed from plastic preforms by blowing processes. To this end, usually so-called stretch-blowing machines are used which apply compressed air to the plastic preforms and usually also stretch them by means of a stretching rod. More precisely, plastic preforms (also referred to as parisons) produced in such stretch-blowing machines for plastic containers are transported through a heating device on a transport line before being processed in the blowing station. Each plastic preform is here already formed with a mouth which substantially corresponds to the mouth of the finished container or respectively bottle.

The plastic preforms thereby are normally injection mouldings which are brought to a forming temperature in the heating device and then formed into their definitive shape in the blowing apparatus. In the heating module, the plastic preforms on normally carried by a spindle and a transport mandrel which is mounted on a chain link. In the heating apparatus, several chain links with spindles mounted thereon are joined and thus forming an endlessly circulating chain. On the outside, in particular of the straight long sides of this transport path, heating devices are provided which supply heat to the plastic preform by infrared radiation. Reflectors are often arranged on the inside and on the floor to make the best possible use of the emitted infrared radiation.

The plastic preforms are clamped in their mouth region from the inside by means of the transport mandrel via a friction connection. Thus, the plastic preforms are held. In the case of poor tolerances or insufficient clamping force, with this arrangement the plastic preforms can fall off. These then fall into a heating lane below and could possibly cause damage or even fires there.

This problem is solved in the prior art in that sufficient space is left below the transport path of the plastic preforms. This means that even if the plastic preform falls out of its retaining mandrel, it does not constitute a danger to the following plastic preforms since there is sufficient clearance in the lower region of the heating device.

In the prior art, however, procedures are also known in which the actual reflector elements are brought as close as possible to the plastic preforms. This, however, entails the disadvantage that this very clearance is no longer present and therefore increases the risk that if plastic preforms fall, these could lead to major damage to the heating device.

The present invention is therefore based on the object of creating an apparatus and a method for heating plastic preforms which firstly works in an energy-efficient manner but secondly also reduces safety risks which result in particular from the possibility of plastic preforms falling out of their carriers. These objects are achieved according to the invention with the subjects of the independent claims.

Advantageous embodiments and refinements are the subject of the subclaims.

An apparatus according to the invention for heating plastic preforms has a transport device which transports the plastic preforms along a predefined transport path. The transport device thereby has a plurality of holding elements which are suitable and intended for holding the plastic preforms. The apparatus also has a heating device which heats the plastic preforms transported by the transport device, wherein this heating device has a wall element which for at least part of the time is arranged below the transport path of the plastic preforms, wherein this wall element is movable.

According to the invention, the apparatus has a detection device which detects an incorrect position and/or falling of at least one plastic preform in relation to the holding element holding it, and a control device which initiates a movement of the wall element on the basis of the incorrect position and/or falling of a plastic preform detected by the detection device.

Advantageously this movement element serves to prevent the plastic preform from obstructing further plastic preforms. In particular by the movement of the wall element, this plastic preform is intended to be ejected from the transport flow and in particular from the heating device, so that the plastic preform cannot cause damage.

Advantageously this wall element is formed as a reflector element which is suitable and intended at least for reflecting infrared radiation.

Advantageously, this wall element is displaceable in a longitudinal direction of the plastic preforms and/or movable at least in segments in this longitudinal direction. It would however also be possible for said wall element to be moved transversely to this longitudinal direction in order to eject fallen plastic preforms.

It is possible here that this wall element is arranged directly below the transport path of the plastic preforms. It is, however, also possible that a corresponding wall element is located laterally below the transport path, for example in the form of a side wall element which can also be folded up or respectively moved away when a plastic preform falls.

In a further advantageous embodiment, the wall element is displaceable in relation to the heating element. In this way in particular an adaptation to different geometries and in particular lengths of the plastic preforms can be achieved.

In a further advantageous embodiment, the detection device allows an allocation or respectively localisation of the fallen plastic preform. It is possible here for example that it can be established from which of said straight segments of the transport path the plastic preform fell. It would, however, also be possible for the detection device to be able to establish individually from which holding element the plastic preform fell.

In a further advantageous embodiment, the detection device detects the incorrect position and/or falling of the plastic preforms in a contactless manner. This falling can then be detected for example with optical and/or acoustic means. It would however also be possible for a detection means to be arranged directly on the respective holding element, such as a mechanical detection means which detects when no plastic preform is any longer present in the respective holding element.

In a further advantageous embodiment, a drive device is provided for moving the wall element. This drive device can for example be a pneumatic and/or electric drive.

In a further advantageous embodiment, the apparatus has a radiation device as well as a detection or respectively receiving device which receives the radiation emitted by the radiation device, or respectively is suitable and intended for this. One or more radiation and detection devices can be arranged in each heating line. Preferably a radiation and detection device is provided for each heating module.

Preferably an optical path runs below the plastic preforms between the radiation device and the receiver device. In this embodiment, the detection device is advantageously formed as a light barrier unit which can detect the falling of the plastic preform.

Preferably a laser beam is used here which can also be deflected one or more times.

Thereby, preferably the optical path of this light barrier or respectively laser runs along the transport direction of the plastic preforms or respectively parallel thereto. In this case it can be established if any plastic preform has fallen along this transport path. It would however also be possible for the optical path to run in a zigzag fashion transversely to the transport path of the plastic preforms. It would also be possible for several radiation devices and several detection devices to be provided, which thus form a plurality of optical paths. In this case it would also be possible to establish from which holding element a plastic preform has fallen.

Advantageously the distance between the optical path of the radiation device and the plastic preform, or respectively in particular its lower end, is between 0.2 cm and 5 cm, preferably between 0.4 cm and 5 cm, preferably between 1 cm and 5 cm, and particularly preferably between 1 cm and 4 cm. The optical path below the plastic preforms can be arranged centrally and/or adapted automatically to the geometry of the plastic preforms. A corresponding control system for this can read the data concerning geometry from the machine control system and from these set the optimum optical path.

In this way a very fast response to a falling of a plastic preform can be ensured. In this way it can also be achieved that in some cases, even if the plastic preform falls at an oblique angle, its falling can interrupt the optical path and hence be detected. Also a very rapid reaction is possible thanks to this small distance, for example so that the wall element can quickly be removed or respectively brought into a position which ensures that the fallen plastic preform no longer obstructs the other plastic preforms.

In a further advantageous embodiment, at least one radiation deflection element is arranged in an optical path between the radiation device and detection device. This radiation deflection element can for example be a mirror or a prism. In this way the optical path can be segmented in order, as stated above, to allow a more precise localisation of a falling plastic preform. This also takes into account the circumstance that, in particular on long stretches within the heating device, the efficiency of a light barrier diminishes.

In a further advantageous embodiment, the wall element is movable such that the ejection of a falling plastic preform is made possible. In this way, not only is the wall element moved to prevent a fire or similar, but this movement of the wall element also serves to eject the fallen plastic preform.

In a further advantageous embodiment, the apparatus has a turning device which allows a rotation of the individual plastic preforms about their longitudinal axes or axes parallel thereto, during their transport and in particular also during their heating. Advantageously this turning device hereby allows a complete rotation and in particular several complete rotations. Advantageously therefore the plastic preform is rotated about its own axis several times during its heating or respectively transport through the heating device.

In a further advantageous embodiment, the heating device has at least one heating element which is arranged laterally next to the transport path of the plastic preforms. Advantageously this heating element is arranged outside a circulating transport path of the holding element. In a further advantageous embodiment, a plurality of such heating elements is arranged along the transport path of the plastic preforms. Here it is possible that these heating elements can be controlled independently of each other, and where applicable individual heating elements can also be switched on and respectively off as required.

Advantageously here these heating elements are arranged such that the thread of the plastic preform is not heated. To this end for example screening elements can be arranged which deflect the heat or respectively thermal radiation away from the threads of the plastic preforms. Instead of infrared radiation however, microwave radiation can be used to heat the plastic preforms. It would for example also be possible for the heating device to have a plurality of heating cavities within which the plastic preforms are transported.

In a further advantageous embodiment, the device also has reflector elements arranged laterally next to the transport path of the plastic preforms. In this way the plastic preforms are guided between the heating elements and said reflector elements.

In a further advantageous embodiment, the heating elements extend transversely and in particular vertically to said wall or respectively reflector element which is located below the transport path of the plastic preforms.

In a further advantageous embodiment, the heating device has two substantially rectilinear transport lines. Advantageously, said wall elements are arranged below these rectilinear transport lines and are also movable.

In a further advantageous embodiment, the wall running below the transport path of the plastic preforms is segmented. This means that individual regions of this wall or respectively wall element can be opened or respectively moved individually. This embodiment achieves that, when the floor wall is opened, there is no need to dispose of an entire group of plastic preforms. It must be taken into account here that said heating process of the plastic preforms is set very precisely, and possibly even a brief opening of the entire reflector wall can change the heating of the plastic preforms such that they are no longer suitable for the blow-moulding process also following the heating.

In a further advantageous embodiment, the wall element has a concavity through which for example a lower base cone of the plastic preform can pass. The heat transfer to the plastic preforms can be further improved by means of such a concavity.

In a further advantageous embodiment, the apparatus has a capture device to capture fallen plastic preforms. This capture device can for example also be located below said wall. If a plastic preform falls, by movement of the wall element it can then enter the capture device.

In a further advantageous embodiment, at least one element arranged below the transport path of the plastic preforms has a surface which slopes in relation to the horizontal plane (facing the plastic preforms) at least in segments. This slope can advantageously allow a fallen plastic preform and/or constituents of this plastic preform, such as a liquefied mass, to be discharged from the apparatus. Advantageously here a slope angle of this surface lies in a plane which runs vertically to the transport path of the plastic preforms. Preferably this slope angle, at least in segments, is constant along the transport path of the plastic preforms.

Preferably this element or respectively wall element is a floor tile (set at a predefined angle, i.e. slope angle) in order to guarantee, in the event of a preform loss in the oven, that the fallen plastic preform will neither obstruct the following plastic preforms nor begin to burn and hence damage the oven. If a plastic preform falls and has already been slightly heated, it begins to become very sticky, whereupon the following plastic preforms in the transport path will adhere to this and can thus also be pulled from the mandrel or respectively their holding device. Thus, within a very short time, a large mass of cohesive plastic preforms can be formed which can begin to burn because of the heat in the oven. By angling the floor tile, the preform can be removed from the transport path or respectively can slide out of the transport path.

In addition it is conceivable that the sloping wall element or respectively angled floor tile guarantees that on falling of the plastic preform after liquefaction, a controlled outflow of the liquid PET mass takes place.

In addition it is possible to deflect the heat radiation or respectively infrared radiation onto a cone region of the plastic preforms better by such a slope of the wall element or respectively tile.

Preferably a slope angle by which the wall element, or respectively a surface of the wall element facing the transport path of the plastic preforms, is tilted in relation to the horizontal is between 1° and 15°, preferably between 2° and 12°, and particularly preferably between 3° and 7°, and particularly preferably around 5°. Furthermore it would be possible that such a sloping segment runs in a straight line, although a curved course is also conceivable. In the case of a curved course, it is conceivable that the slope angle lies in a region of 5° at least locally.

The present invention is furthermore directed at an arrangement for producing plastic bottles. This arrangement has a heating apparatus of the type described above and downstream of this a forming device for forming the plastic preforms into plastic containers. Advantageously this apparatus for forming plastic preforms into plastic containers is a stretch-blowing machine which in particular has a plurality of forming stations arranged on a movable carrier. Advantageously this movable carrier is a so-called blowing wheel which guides the plastic preforms to be expanded along a circular path. Advantageously the individual forming stations of this apparatus for forming plastic preforms into plastic containers have side parts which can be pivoted in relation to each other and in the closed state form a cavity within which the plastic preforms can be expanded into the plastic containers. In addition this forming device has a pressurisation device which can fill the plastic preforms with a gaseous medium, in particular with blowing air, to expand them.

In a further advantageous embodiment, the arrangement also has a control device which controls a forming process of the plastic preforms into plastic containers also as a function of at least one parameter characteristic of the heating of the plastic preforms.

The present invention is furthermore directed at a method for heating plastic containers and in particular plastic preforms. The plastic preforms are here transported by means of a transport device along a predefined transport path, and during this transport are heated by means of at least one heating device or respectively heating device. Furthermore during their transport, the plastic preforms are held on holding elements. According to the invention, an incorrect position and/or falling of a plastic preform is detected by means of a detection device and in reaction to this detection, a wall element lying below the transport path of the plastic preforms is moved.

It is therefore proposed also according to the method that a falling of the plastic preforms is detected and in reaction thereto, said wall element is moved, in particular to prevent the fallen preform from obstructing further plastic preforms or respectively their transport.

Advantageously the movement of the wall element is carried out to eject the plastic preform from the apparatus or respectively from the heating process.

Advantageously the falling of the plastic preform is detected in a contactless manner.

In a further advantageous method, the movement of the wall element is a linear movement and/or a swivel movement.

Advantageously thereby an axis of such a swivel movement can be parallel to a transport direction of the plastic preforms.

Further advantages and embodiments arise from the enclosed drawings.

These show.

Figure 1:
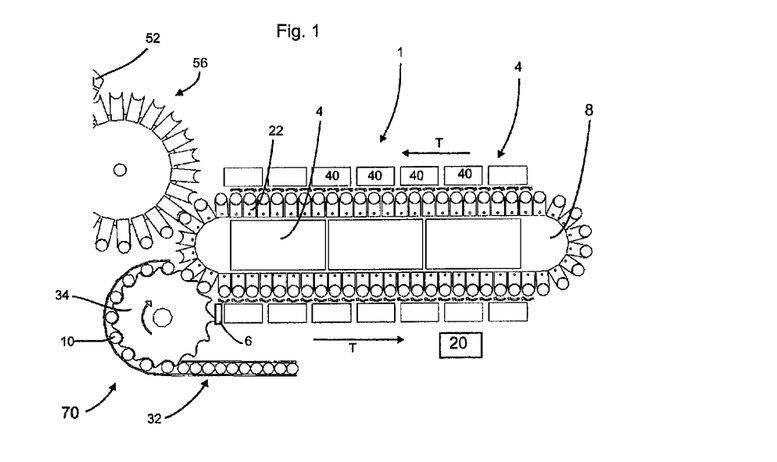
FIG. 1 a diagrammatic depiction of a device for heating plastic preforms.

FIG. 1 shows a diagrammatic depiction of an arrangement 70 for producing containers. This arrangement 70 has a feed device 32 via which plastic preforms 10 can be supplied to an apparatus, designated as a whole with 1, for heating these plastic preforms 10. Reference numeral 34 designates a separation device which isolates the plastic preforms 10. This separation device here is a sawtooth star which on its outer periphery has a plurality of recesses which serve to guide the plastic preforms. In this way the isolated plastic preforms 10 are now supplied to the apparatus 1 for heating. This apparatus for heating has a plurality of holding elements 22 which hold the individual plastic preforms 10 during their heating. Advantageously thereby the holding elements 22 each have mandrels which engage in the mouths of the plastic preforms in order to hold these by friction fit. Reference numeral 4 as a whole designates a heating device which heats the individual plastic preforms 10.

Reference numeral 40 relates to heating elements which are arranged along the transport path T of the plastic preforms and hence are part of the heating device 4. In addition it would also be conceivable that such heating elements are arranged also inside the transport path T. It is evident that the plastic preforms are first transported along a rectilinear portion, then their movement direction is reversed by a reversing wheel 8 and they are returned along a second rectilinear path. Furthermore it is evident from the individual small arrows that the plastic preforms are also rotated in relation to their longitudinal axes during heating. Here it would be possible for further reflector elements to lie opposite the heating elements and for the transport path of the plastic preforms to run between these heating elements and the reflector elements.

It would also be possible for the heating elements 40, the reflector elements opposite these and the respective floor walls 42 to form a heating lane which is only open at the top and in which the plastic preforms 10 are transported. It would also be possible here for this heating lane to have a curved profile in the region of the reversing wheel. Also the floor walls preferably constitute parts of the heating device 4.

A forming device for forming the plastic preforms into plastic containers follows the apparatus 1 for heating the plastic preforms. However only a small portion of this forming device is shown, namely part of such a forming station 52.

This forming station is arranged on a carrier or respectively blowing wheel together with a plurality of further forming stations.

Reference numeral 56 designates a transport star which transports the plastic preforms 10 from the heating apparatus 1 to the forming device.

Reference numeral 6 as a whole designates diagrammatically a detection device which in particular detects the falling of plastic preforms from their holding elements 22. Reference numeral 20 identifies a control device which initiates a movement of the wall element in reaction to a signal output by the detection device, in particular a signal which occurs when a plastic preform has become detached from its holding element 22, so that the falling plastic preform no longer obstructs the further plastic preforms.

Figure 2:
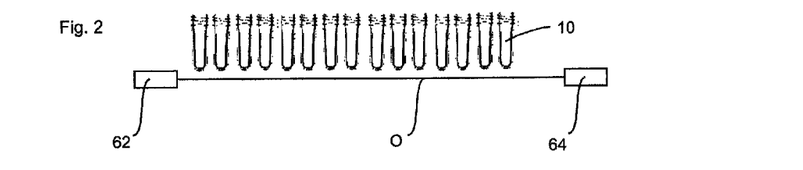
FIG. 2 a rough diagrammatic depiction of an apparatus according to the invention.

FIG. 2 shows a diagrammatic depiction of a device 1 according to the invention. Here again the individual plastic preforms 10 are shown. Below these plastic preforms a radiation device 62 is provided which emits radiation, in particular laser radiation, to a receiver device 64. In this way a falling of the plastic preforms can be detected. Reference symbol O designates an optical path of this radiation. The radiation device 62 and the receiver device 64 are therefore parts of the detection device 6 indicated in FIG. 1.

Figure 3A:
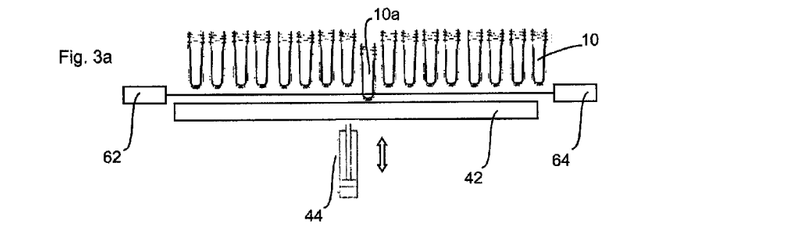
FIGS. 3*a*, 3*b* two diagrams to illustrate a method according to the invention.
Figure 3B:
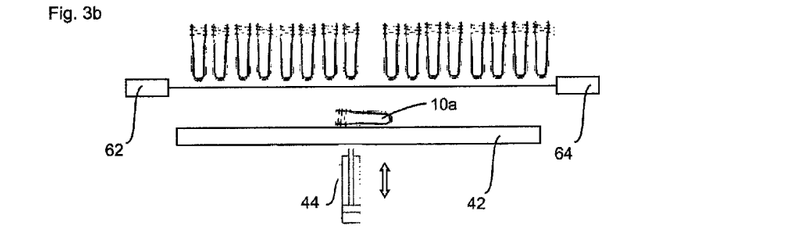

FIGS. 3a and 3b illustrate the method according to the invention. FIG. 3a shows that a particular plastic preform 10a has fallen and this now interrupts the light beam O, which extends from the radiation device to the detection device 64. This interruption is detected and in reaction thereto, a floor element or respectively floor wall 42 of the apparatus is lowered by means of a drive device 44. FIG. 3b shows a state in which the wall element is lowered. It is evident that the fallen plastic preform 10a can now lie on this floor segment. This ensures that this plastic preform 10a does not obstruct the transport of the further plastic preforms 10. Advantageously the drive device allows a movement speed of the wall element which is preferably greater than 2 m/s.

Figure 4:
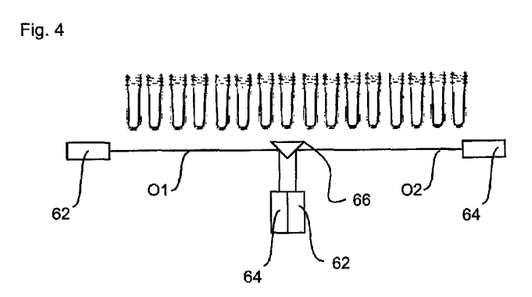
FIG. 4 a further embodiment of an apparatus according to the invention.

FIG. 4 identifies a further embodiment of the apparatus according to the invention. In this embodiment, two radiation devices 62 and two detection devices 64 are provided which thus form two optical paths O1 and O2. A radiation deflection element 66 is used to deflect the two beams by respectively 90°.

In other words, the plastic preforms 10 are here transported in a hanging manner through a heating lane suspended by means of a transport mandrel not shown. Laser light barriers arranged directly below the cones of the plastic preforms 10 detect when a plastic preform becomes detached from its transport mandrel. Thereupon, as stated above, the floor tile or respectively wall element 42 is lowered, for example via a pneumatic fast-switching cylinder.

Since the scatter radiation present in the heating tunnel can adversely affect the function of the light or respectively laser light barriers above a certain distance or respectively certain length of the heating tunnel, the arrangement shown in FIG. 4 of two transmitters (or radiation devices), receivers, a mirror or respectively prism 66 or reflectors is proposed. Instead of light radiation, sound emitters and receivers can also be used.

Figure 5A:
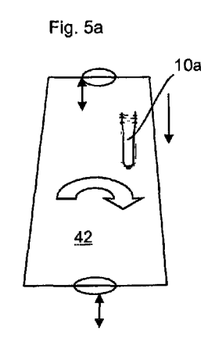
FIGS. 5*a*, 5*b* two diagrams to illustrate the movement of the wall element.
Figure 5B:
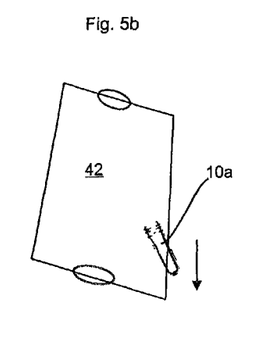

FIGS. 5a and 5b show two further diagrams to illustrate a movement of the wall element 42. Here FIG. 5a shows a situation in which a plastic preform has fallen onto the wall element 42. As shown in FIG. 5b, this wall element 42 swivels and hence the plastic preform 10a concerned falls down. After the plastic preform 10a has fallen down e.g. onto an ejection device arranged below, the wall element 42 can be swiveled back to its original position or respectively rotated by 180°. In this way it can be guaranteed that the preforms transported on the holding elements 22 retain the predefined temperature profile, since the swiveling of the wall element 42 back to its original position means that the space to be heated inside the heating device (up to the time of swiveling) remains the same. The wall element or respectively elements 42 are preferably designed in a reflective manner on both sides.

Figure 6A:
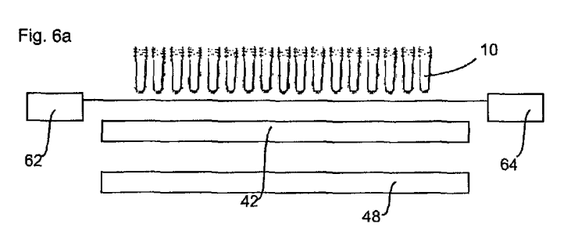
FIGS. 6*a*-6*d* four further diagrams to illustrate a method according to the invention.
Figure 6B:
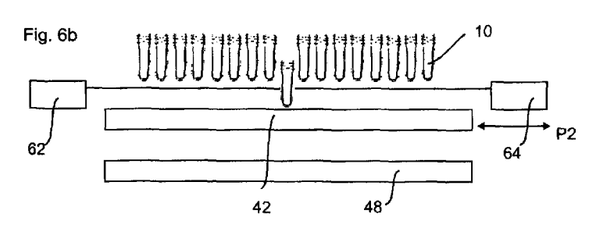
Figure 6C:
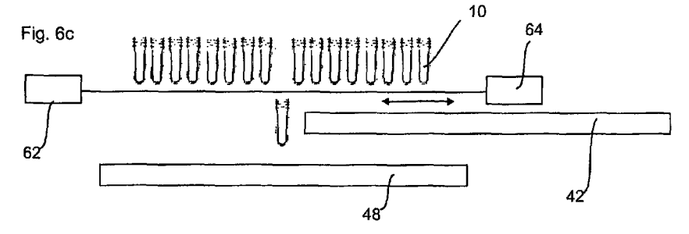
Figure 6D:
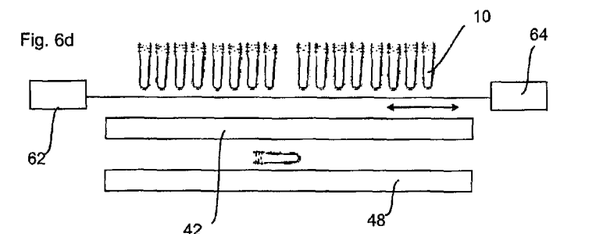

FIGS. 6a-6d show a further embodiment of a method according to the invention. In this embodiment, as evident, below the wall element 42 a capture device 48 is provided which serves to capture fallen plastic preforms 10a. Again, when the falling of a plastic preform 10a is detected, here the wall element 42 can be moved as illustrated by the arrow P2 (see FIG. 6b). As soon as the wall element 42 has moved far enough, the plastic preform 10a can fall into the capture device 48 as shown in FIGS. 6c and 6d. In the embodiments shown in FIGS. 6a-6d, the wall element 42 is moved in the transport direction of the plastic preforms. It would however also be possible for this wall element to be moved vertically thereto, for example vertically to the plane of the drawing, or also if desired in a direction oblique thereto.

Figure 7A:
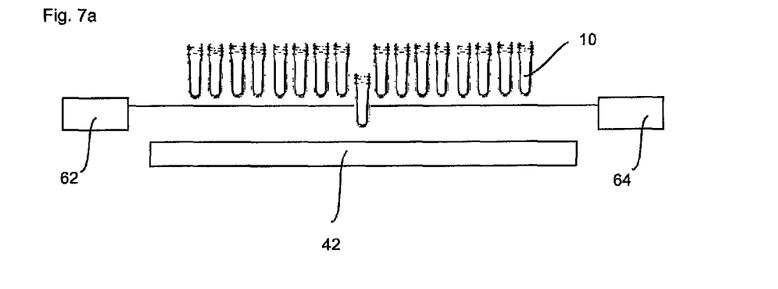
FIGS. 7*a*-7*d* four diagrams of a further method according to the invention.
Figure 7B:
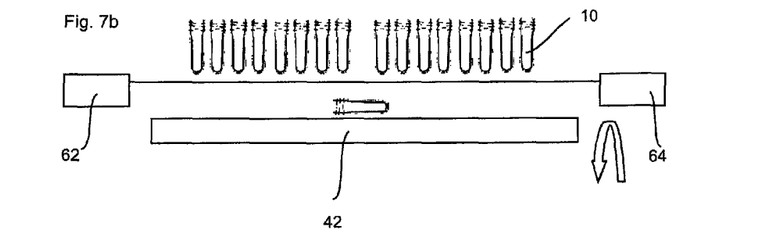
Figure 7C:
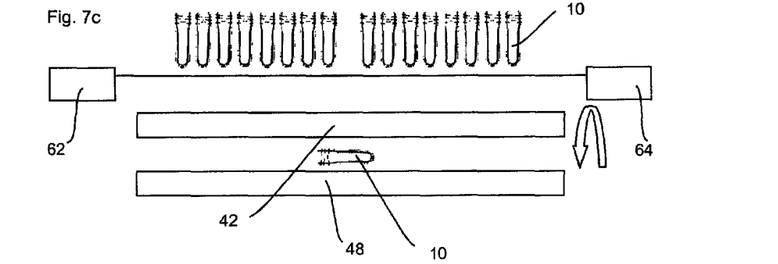
Figure 7D:
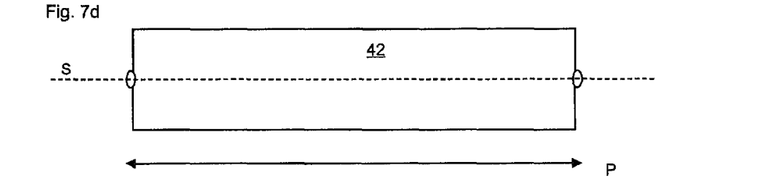

FIGS. 7a-7d show a further embodiment of the method according to the invention. In this embodiment, the wall element 42 is arranged pivotably, as shown in FIGS. 5a and 5b. Here again, when the falling of a plastic preform is detected, the wall element 42 can be swiveled as shown in FIG. 7d and in this way the plastic preform 10a falls from the wall element 42. The plastic preform can again here fall into a capture device 48 if desired.

It would also be possible for the plastic preform to be transported back from the capture device 48 in order to be reheated, but it would also be conceivable for the ejection to be definitive. Whether ejection is definitive or whether the plastic preform is returned can depend on the extent to which this has already been heated. It is known in the prior art here that after a certain degree of heating, the plastic preform can no longer be reused, in particular if the crystallisation temperature has already been passed.

FIG. 7d shows diagrammatically the swiveling of the wall element 42 in relation to a swivel axis which is here also parallel to the transport path T of the plastic preforms.

Figure 8:
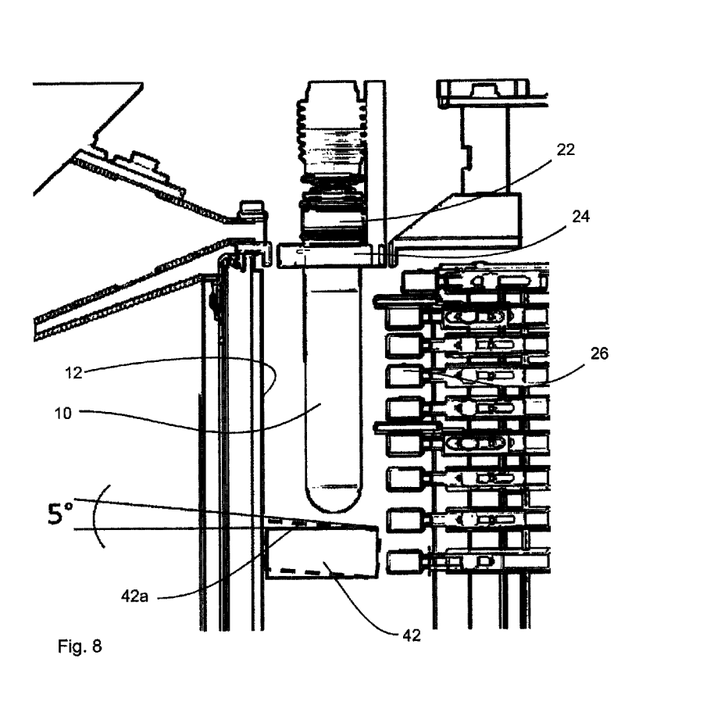
FIG. 8 a diagram of a further embodiment of the present invention.

FIG. 8 shows a further embodiment of an apparatus according to the invention. In this embodiment the holding element is shown which serves to receive the plastic preform 10. Reference numeral 24 designates a screening element such as a screening plate which protects from thermal radiation the threads of the plastic preform which must not be heated. Reference numeral 26 refers to a radiation element which is part of the heating element. This radiation element can thereby extend along the transport path of the plastic preforms.

The floor wall 42 or respectively the wall element 42, in the embodiment shown in FIG. 8, is not horizontal, or respectively in particular the surface 42a of the floor wall 42 facing the transport path of the plastic preforms does not lie horizontally but slopes by an angle of 5° here. In this way fallen plastic preforms can automatically fall or slip out of a region of possible collision with the following plastic preforms.

Advantageously the wall element is not arranged precisely centrally in relation to a longitudinal axis of the plastic preforms but is offset thereto. Preferably the wall element 42 has a smaller distance from the reflector device 12 than from the radiation elements 26. Generally it is preferred if the plastic preforms are transported between the radiation elements 26 and the reflector device 12.

Preferably the wall element has a lateral spacing from the radiation elements which is between 1 mm and 4 mm, preferably between 1 mm and 3 mm, and particularly preferably around 2 mm.

Figures 9A, 9B:
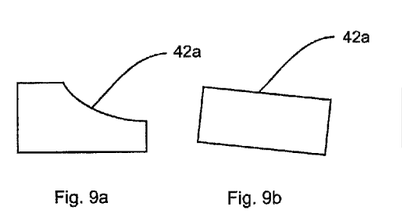
FIGS. 9*a*-9*c* three diagrams to illustrate a slope.
Figure 9C:
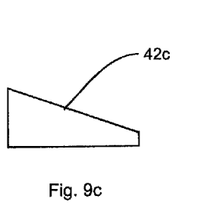

FIGS. 9a-9c show as examples three diagrams to illustrate a slope of the surface 42a. In the view shown in FIG. 9b, the surface is formed as a plane which as a whole is tilted in relation to the horizontal. In the embodiment shown in FIG. 9a, the surface 42a is formed curved and has a greater slope or respectively pitch in the direction of the reflector device than in the direction of the radiation elements.

In the embodiment shown in FIG. 9c, the surface 42a is also formed sloping but the entire wall element 42 is formed with a triangular cross-section.

The applicant reserves the right to claim all features disclosed in the application documents as being essential to the invention where novel individually or in combination in relation to the prior art.

LIST OF REFERENCE NUMERALS

1 Device
4 Heating device
8 Reversing wheel
6 Detection device
10 Plastic preforms
10a Fallen plastic preform
12 Reflector device
22 Holding elements
24 Screening element
26 Radiation element
32 Feed device
34 Separation device
40 Heating element
42 Floor wall
42a Surface of the floor wall facing the plastic preforms
44 Drive device
48 Capture device
52 Forming station
56 Transport star
62 Radiation device
64 Detection device
66 Radiation deflection element
70 Arrangement for production of containers
T Transport path
O, O1, O2 Optical paths

The invention claimed is:

1. An apparatus for heating plastic preforms, with a transport device which transports the plastic preforms along a predefined transport path, wherein the transport device has a plurality of holding elements for holding the plastic preforms, with at least one heating device which heats the plastic preforms transported by the transport device, wherein this heating device has a wall element which is arranged for at least part of the time below the transport path of the plastic preforms, wherein this wall element is movable, wherein the apparatus has a detection device which detects an incorrect position and/or a falling of at least one plastic preform in relation to the holding element holding this, and a control device which initiates a movement of the wall element on the basis of an incorrect position and/or falling of the at least one plastic preform detected by the detection device.

2. The apparatus according to claim 1, wherein the detection device detects the incorrect position and/or falling in a contactless manner.

3. The apparatus according to claim 2, wherein the detection device has a radiation device as well as a receiver device for receiving radiation emitted by the radiation device.

4. The apparatus according to claim 3, wherein at least one radiation deflection element is arranged in an optical path between the radiation device and the receiver device.

5. The apparatus according to claim 1, wherein the wall element is movable so as to allow ejection of the falling plastic preform.

6. The apparatus according to claim 1, wherein the apparatus has a rotation device which allows rotation of the individual plastic preforms about their longitudinal axes or axes parallel thereto during their transport.

7. The apparatus according to claim 1, wherein the heating device has at least one heating element which is arranged laterally next to the transport path of the plastic preforms.

8. The apparatus according to claim 1, wherein the apparatus has a capture device to capture fallen plastic preforms.

9. The apparatus according to claim 1, wherein the wall element is segmented at least in portions along the transport path of the plastic preforms.

10. The apparatus according to claim 1, wherein a surface of the wall element facing the plastic preforms is tilted in relation to a horizontal plane by an angle which lies between 1° and 10°.

11. A method for heating plastic performs, wherein the plastic preforms are transported by a transport device along a predefined transport path and during this transport are heated by at least one heating device, and wherein the plastic preforms are held on holding elements during their transport, wherein an incorrect position and/or a falling of a plastic preform is detected by a detection device and that in response to such a detection, a wall element lying below the transport path is moved.

12. The method according to claim 11, wherein the movement of the wall element is a linear movement and/or a swivel movement.

* * * * *